(12) United States Patent
Butler

(10) Patent No.: US 11,093,976 B2
(45) Date of Patent: Aug. 17, 2021

(54) BROKER EXTENSIONS TO REAL-TIME BIDDING IN DIGITAL MEDIA

(71) Applicant: Millennial Media, Inc., Baltimore, MD (US)

(72) Inventor: James M. Butler, Tyngsboro, MA (US)

(73) Assignee: Verizon Media Inc., New York, NY (US)

(*) Notice: Subject to any disclaimer, the term of this patent is extended or adjusted under 35 U.S.C. 154(b) by 1387 days.

(21) Appl. No.: 14/556,335

(22) Filed: Dec. 1, 2014

(65) Prior Publication Data
US 2016/0155157 A1 Jun. 2, 2016

(51) Int. Cl.
*G06Q 30/02* (2012.01)

(52) U.S. Cl.
CPC ............... *G06Q 30/0275* (2013.01)

(58) Field of Classification Search
CPC ............... G06Q 30/02; G06Q 30/0275
See application file for complete search history.

(56) References Cited

U.S. PATENT DOCUMENTS

| | | | | |
|---|---|---|---|---|
| 8,595,087 B1* | 11/2013 | Daman | ............... | G06Q 30/08 705/26.3 |
| 2003/0101454 A1* | 5/2003 | Ozer | ............... | G06Q 30/02 725/42 |
| 2005/0246266 A1* | 11/2005 | Stefanovic | ............... | G06Q 30/08 705/37 |
| 2006/0020523 A1* | 1/2006 | Song | ............... | G06Q 30/0256 705/14.54 |
| 2008/0147497 A1* | 6/2008 | Tischer | ............... | G06Q 30/02 705/14.61 |
| 2010/0082393 A1* | 4/2010 | Vassilvitskii | ............... | G06Q 30/02 705/14.19 |
| 2010/0100422 A1* | 4/2010 | Schwarz | ............... | G06Q 30/02 705/7.35 |
| 2010/0100471 A1* | 4/2010 | Li | ............... | G06Q 30/02 705/37 |
| 2010/0106613 A1* | 4/2010 | Bhatia | ............... | G06Q 30/02 705/26.1 |
| 2010/0241511 A1* | 9/2010 | Cunningham | ............... | G06Q 30/02 705/14.46 |
| 2011/0231264 A1* | 9/2011 | Dilling | ............... | G06Q 30/02 705/14.71 |
| 2012/0041816 A1* | 2/2012 | Buchalter | ............... | G06Q 30/02 705/14.41 |
| 2014/0136337 A1* | 5/2014 | Ringdahl | ............... | G06Q 30/0273 705/14.71 |

(Continued)

*Primary Examiner* — Thuy N Nguyen
(74) *Attorney, Agent, or Firm* — Cooper Legal Group, LLC (57) ABSTRACT

The present invention provides protocol enhancements and variations to the current state of RTB that provide additional buying methods to address the challenges associated with RTB, such as resource intensiveness for both exchanges and bidders and lack of a truly automated way of guaranteeing the win rates necessary to fulfill guaranteed campaigns with predictable risk. These methods include a) open bids that are automatically entered in future auctions in case of loss, b) buy orders for time-limited, small quantities of impressions specified either with a live auction bid response or via a separate interface, and c) guaranteed buy orders that allow impressions to be secured without a live auction in return for a premium above fair market value.

20 Claims, 5 Drawing Sheets

(56) References Cited

U.S. PATENT DOCUMENTS

| | | | |
|---|---|---|---|
| 2014/0136338 A1* | 5/2014 | Ringdahl | G06Q 30/0273 |
| | | | 705/14.71 |
| 2014/0136339 A1* | 5/2014 | Ringdahl | G06Q 30/0275 |
| | | | 705/14.71 |
| 2014/0136341 A1* | 5/2014 | Ringdahl | G06Q 30/0273 |
| | | | 705/14.71 |
| 2014/0136342 A1* | 5/2014 | Ringdahl | G06Q 30/0275 |
| | | | 705/14.71 |
| 2014/0136345 A1* | 5/2014 | Ringdahl | G06Q 30/0273 |
| | | | 705/14.71 |
| 2014/0316882 A1* | 10/2014 | Swix | G06Q 30/02 |
| | | | 705/14.43 |

* cited by examiner

BROKER EXTENSIONS TO REAL-TIME BIDDING IN DIGITAL MEDIA

BACKGROUND OF THE INVENTION

1. Field of the Invention

The present invention is directed to the real-time selling and buying of digital advertising and in particular, to the efficiencies that can be gained through enhancing traditional real-time bidding protocols.

2. Background Information

Real-Time Bidding (RTB) has become a very popular auction-based method of transacting digital advertising. A page in a website that contains a space for an advertisement is one such example. At the moment the page is being composed or rendered, the website will request an ad from an RTB exchange. This single instance of displaying a given ad is called an "impression". The exchange in turn broadcasts the request to its known set of bidders. Each bidder is executing a set of advertising campaigns on behalf of the advertisers they represent and each must decide if this impression is suited to any of their current campaigns and if so, how much to bid. Bidders typically have on the order of 100 mS to respond with their bids, after which the exchange selects the winning bid, notifies the winner, and serves the ad back to the requesting website for display.

RTB has many business and technical advantages over other methods of ad selection and serving, but there are also significant problems. For the exchange, a key problem is bandwidth. Each bid request sent to a bidder for an impression can range from hundreds to thousands of bytes. Even a modest-sized exchange with 50 bidders and 50 billion impressions per month can consume several petabytes of monthly bandwidth.

For bidders, there are several challenges. First, due to campaign targeting goals, it is not unusual for only a small fraction of bid requests to match their needs. This means that their bidding systems must be scaled to process bid request loads 100 to 1,000 times their actual need. Second, the real-time nature of the bidding process forces bidders to setup their servers near those of the exchange to mitigate the risk of losing auctions due to Internet latency. This is especially inconvenient if bidding on multiple, geographically dispersed exchanges, necessitating complex distributing computing techniques for coordination. Third, many bidders commit to contracts with their advertisers that guarantee they can buy the number of suitable impressions to satisfy their campaigns. Since the auction process is fair and blind, the bidders can secure no such guarantees and thus must absorb this risk.

SUMMARY OF THE INVENTION

This invention specifies and discloses enhancements to the standard RTB protocol that solve to varying degrees the problems cited with the current state of the art.

The first enhancement defines the concept of a bidder responding to a bid request with a standard bid, but also including a time-limited "open bid" for a similar impression if it should lose the current auction. As a generalization on this enhancement, an open bid could be replaced by a "buy order" indicating that the bidder wishes to buy a number of similar impressions whether or not it wins or loses the current live auction. With this mechanism in place, the bidder could instruct the exchange to lower its bid request rate, knowing that its open buy orders will still be evaluated. This reduces the exchange's bandwidth usage, it reduces the bidder's processing requirements, and any open buy orders in-queue within the exchange would not be sensitive to Internet latency variations.

The second enhancement extends the open buy order concept by allowing the bidder to place an order outside of a live auction. In this case, the specifications for suitable impressions would be more complex since there would be no current "example" request to use for similarity. However, a bidder using this technique could theoretically remove the need to ever receive live auction bid requests, thereby reducing its processing load dramatically, eliminating real-time internet latency concerns, and further reducing bandwidth for the exchange.

The third enhancement builds on the buy order concept to realize a means of providing guaranteed procurement of impressions. For this feature, a bidder places a buy order in either the response or the request method along with a "guaranteed" indicator. The exchange places this "guaranteed buy order" in queue. For future auctions and prior to soliciting new bids, this queue is searched for the oldest guaranteed buy order that matches the request. This buy order is immediately fulfilled, clearing at fair market value for similar impressions plus a fee for guaranteed processing. This fee mitigates the publisher's risk that the impression may have sold higher had a live auction been conducted, while allowing the bidder to mitigate their risk of under-serving a campaign and at a predictable market-driven cost basis.

BRIEF DESCRIPTIONS OF THE DRAWINGS

The invention description below refers to the accompanying drawings, of which.

DETAILED DESCRIPTION OF THE INVENTION

Figure 1:
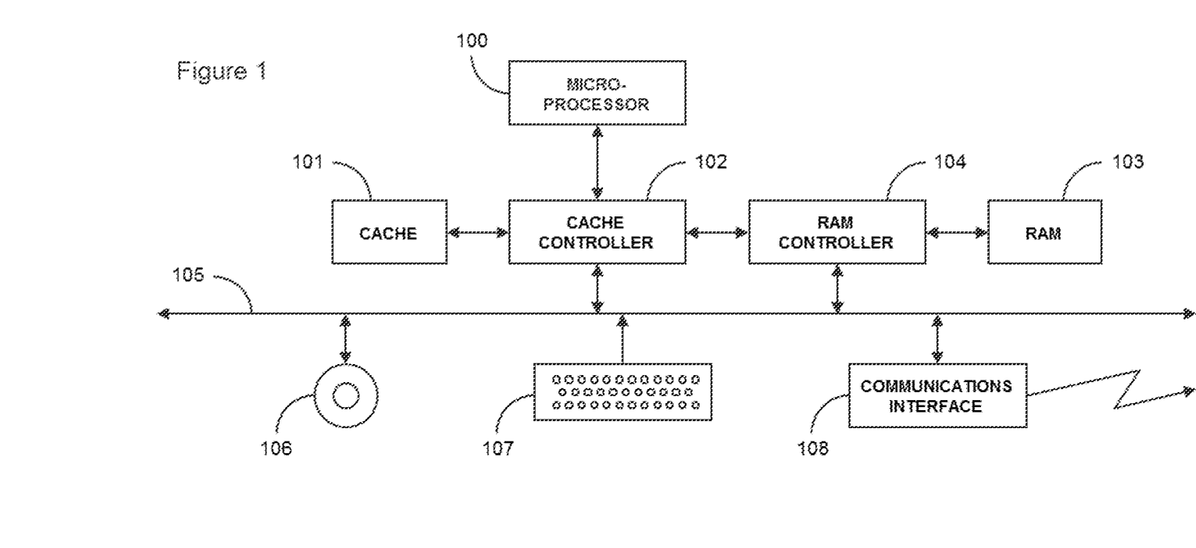
FIG. 1 is a block diagram of a typical computer system that employs the present invention's teachings.

The approach to be described herein for enhancing Real-Time Bidding (RTB) protocols for digital media will typically be implemented in computer systems employed for communicating over the Internet and executing web services functionality. The particular type of computer system employed for this purpose is not critical, but FIG. 1 depicts one type of workstation that can be employed in such a system.

Data that a microprocessor 100 uses and instructions for operating on them may reside in on-board cache memory or be received from further cache memory 101, possibly through the mediation of a cache controller 102. That controller 102 can in turn receive such data from system random access memory ("RAM") 103 through a RAM controller 104 or from various peripheral devices through a system bus 105. The memory space made available to an application program may be "virtual" in the sense that it may actually be considerably larger than RAM 103 provides. So the RAM contents will be swapped to and from a system disk 106.

Additionally, the actual physical operations performed to access some of the most-recently visited parts of the process's address space often will actually be performed in the cache 101 or in a cache on board microprocessor 100 rather than on the RAM 103. Those caches would swap data and instructions with the RAM 103 just as RAM 103 and system disk 106 do with each other.

Independently of the particular memory arrangement that a particular workstation employs, it will typically include some type of user-input device such as a keyboard 107 or mouse (not shown). By using such devices, the user enters data and commands as appropriate. In the case of a workstation employed by provider personnel, such devices would be used for, among other things, configuring and monitoring web service execution.

Systems that implement the present invention's teachings will vary widely in architecture. Furthermore, although the exchange and/or bidder can in principle be implemented in a single computer program, it will more typically be implemented utilizing a plurality of systems interconnected using a local area network. In all cases, however, the systems described herein will be so arranged as to permit communications between the exchange and its bidders over the Internet. Although personnel at either the exchange or bidder may use common workstations, a more-typical arrangement is for different workstations to be used by personnel of different types. In such a case, the workstation would ordinarily be provided with some kind of communications interface 108 to communicate with other workstations or a common data server so that business functions are integrated.

The present invention is not merely a system and method that is carried out via a computer but is directed to a new and novel way computers communicate with each other in the context of a real-time bidding system for the selling and buying of digital advertising. The present invention improves the functioning of computer systems themselves, such as by reducing the amount of bandwidth used during use and operation of RTB systems and making such systems more efficient.

Figure 2:
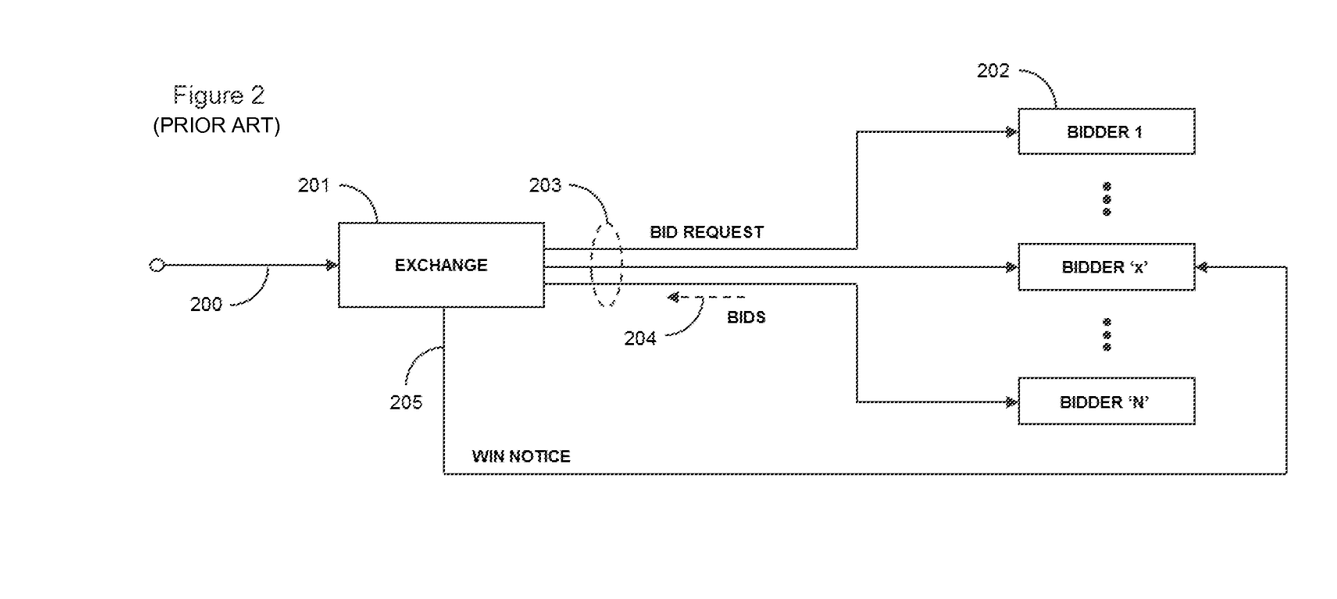
FIG. 2 is a block diagram used to illustrate the current prior art industry standard RTB protocol between an exchange and its bidders.

By way of background, FIG. 2 sets forth details of present state of the art in RTB. The initial event is a request 200 for an individual unit of advertisement from a publisher to present to a user of their website, application, or other media distribution channel. Examples of advertisement ("ad") unit types include but are not limited to banner ads, expandable images, video clips, audio clips, native or in-stream units, or simple text messages. The request 200 is received by an RTB exchange 201 whose objective is to identify a buyer for the impression and secure an advertisement to return in response to the publisher. In current implementations, an ad request may actually carry multiple impressions (e.g., a group of ads on a given web page) and be sold as a group. For purposes of clarity in the narrative of the present invention, we will refer to an ad request as containing one impression since the cardinality of impressions per ad request does not affect the teachings herein.

The exchange is integrated with a plurality of bidders 202 who are trafficking advertising campaigns on behalf of advertisers. This integration is typically over the Internet, but can also be via other connection methods (e.g., a "cross-connect" if exchange and bidder servers are hosted within the same commercial data center). A typical advertising campaign may have certain targeting restrictions (e.g., certain user demographics, user location, publisher content type, acceptance of applicable advertisement units, etc.). Much of this information may be carried within the ad request 200, but the exchange 201 may also invoke third party data sources to augment this information to facilitate targeting by bidders 202. Advertising campaigns typically will also have impression goals, spending caps, time ranges, and other restrictions. For example, a campaign might be defined to show an ad a certain number of times (i.e., impressions), over a specified time range (i.e., flight dates), without spending more than a preset amount of money to buy those impressions, and while only buying the impressions that match the aforementioned targeting criteria.

A typical RTB transaction occurs as follows. When the exchange 201 receives the ad request 200, it prepares to conduct an auction and first must determine the subset of its bidders 202 that will participate. This subset may include all bidders 202, but various business rules may limit participation. For example, the publisher that originated the request 200 may desire to expose their impression only to certain bidders 202. Also, a bidder 202 may have informed the exchange 201 a priori that it is only interested in certain types of impression offers (e.g., users in certain countries, published content of certain types, etc.) or a certain maximum frequency of impression offers (e.g., no more than N per second). Other business and/or technical rules for limiting participation in a given RTB auction may also apply.

Once the set of bidders 202 for an auction has been determined, the exchange 201 prepares a bid request 203, which is derived from the ad request 200, potentially from preconfigured data about the publisher and/or their distribution channel, and any third party data to which the exchange 201 may have access. The exchange 201 then broadcasts these bid requests 203 to all bidders 202 that have been selected to participate in this auction. Each bidder 202 evaluates the data on the bid request 203 against the specifications and progress of the campaigns they are currently executing to determine a) if they want to buy the impression on behalf of one of those campaigns, and if so then b) the price it wishes to bid for the impression. Each bidder 202 who determines that they want to buy the impression prepares a bid 204 and returns it in response to the bid request 203. The exchange 201 will wait until the sooner of a) bid or no-bid responses have been received from all bidders 202 or b) a predetermined maximum auction time after which any responses 204 not yet received will be automatically assumed to be no-bid responses.

The exchange 201 will then evaluate any bids 204 received and select a winner if any. A winner is typically chosen on the basis of highest bid price. However, other rules may cause the highest bidder to forfeit the win; for example if the advertisement contains inappropriate content or a blocked advertiser. The auction may also have a reserve or floor price, typically set by the publisher or exchange 201 such that only bids above this price may be considered. For the purpose of the present invention, we will consider the selection of a winner to be based solely on bid price since these additional rules do not affect and can still be used in combination with the teachings herein.

If and when the exchange 201 selects a winning bid 204, it calculates the clearing price, which is the price the winning bidder 202 will actually pay for the impression. For simple "first price" auctions, the clearing price is the same as the bid price. However, "second price plus" auctions are very common in RTB, wherein the clearing price is some small increment above the second highest bid price, not to exceed the winner's bid price. If the winning bid is the only bid that met or exceeded the floor price, the exchange 201 will typically use the floor price as a substitute for the second place bid for purposes of "second price plus" calculation of clearing price. Some exchanges 201 include additional clearing price calculation rules. For the purpose of the present invention, unless otherwise specified, we will consider the calculation of clearing price to be "second price plus" where the floor price serves as a substitute for the second place bid when necessary since these additional rules do not affect and can still be used in combination with the teachings herein.

If and when a winner has been selected and the clearing price has been calculated, the exchange 201 sends a win notice 205 to the winning bidder 202 (i.e., bidder 'x' in FIG. 1). The win notice 205 enables the bidder 202 to count the impression toward its campaign progress. It is also typical for the exchange 201 to use the win notice 205 to communicate the clearing price to the winning bidder 202.

The winning bidder 202 must now communicate back to the exchange 201 the markup or other specification of the advertisement it wishes to display in this impression. Typical methods of accomplishing this may include a) returning the advertisement as a response to the win notice 205, b) including the advertisement in each bid 204 for use if the bid wins, and c) preloading the advertisement to the exchange 201 and referencing the selected advertisement in either the win notice 205 response or in each bid 204. Any of these methods can be used in combination with the teachings herein. Finally, the exchange 201 returns the selected advertisement from the winning bidder 202 in response to the ad request 200 from the publisher.

There are several challenges with the current state of RTB experienced differently by exchanges and bidders to which the teachings of the present invention are directed at solving.

One problem experienced primarily by the exchange is the problem of "bidder fan-out". The business model around RTB induces an exchange to integrate as many bidders as possible to maximize demand exposure and auction competitiveness. Recall that for each auction, the exchange broadcasts bid requests to its bidders. The more bidders to whom bid requests must be concurrently sent, the more stress is placed on the exchange servers and network devices thereby increasing the cost of exchange operations. Many exchanges resort to capping the number of bidders per auction and implement various selection policies, but this is counter to the business objective of maximizing demand exposure.

Another problem experienced primarily by the exchange is that of excessive network bandwidth. This too is driven in part by the aforementioned bid request broadcasts to bidders and is multiplied by the business driver to maximize ad request traffic and thus auctions per second. For even moderate sized exchanges, monthly data transfer in the form of bid requests can easily exceed several petabytes. The network bandwidth to support this rate of data transfer is very expensive and is exacerbated by the fact that only a small fraction of these will result in winning bids and thus offsetting revenue. This rate of data transfer also drives in part the quantity of servers and other system components, which further increases costs.

One problem experienced primarily by the bidder is that it must receive many times more bid requests than it will actually want or need to fulfill its advertising campaigns, thereby driving up server and network costs. Generally, an advertising campaign will target very specific characteristics of bid requests and only require certain limited quantities. Therefore, the bidder must analyze and discard those bid requests that do not match the criteria of any current campaigns. Of those requests that do match, many may be discarded by the bidder since the current campaigns will only require a certain portion of these impressions. Finally, the bidder may simply not win all of the impressions on which it does bid and thus will need to bid on more. The result is that the bidder must support the technical scale to receive, analyze, and selectively respond to many times more and possibly orders of magnitude more bid requests than its actual demand warrants.

Another problem experienced primarily by the bidder is that it must respond to each bid request within an exchange-defined maximum auction time. Failure to do so is interpreted by the exchange as no-bid due to timeout. Within this maximum time, the bidder must evaluate the bid request in the context of a plurality of advertising campaigns and employ various algorithms to determine its bids if any. This can be technically challenging for a large number of campaigns especially when having to process a very large volume of bid requests per second. Furthermore, the true amount of time available for the bidder to execute its bidding algorithms is the maximum auction time minus the round trip Internet latency between the bidder and the exchange. For example, for an exchange with a 150 mS maximum auction time, a bidder might only have 120 mS if it is 15 mS away from the exchange (i.e., 30 mS round trip) and possibly even less to reserve a margin for Internet latency variability. Bidders that are farther away from an exchange might setup additional servers nearer to the exchange to reduce this latency, but at the cost of additional expense and complexity.

Another problem experienced primarily by the bidder is the need to guarantee a certain win rate at a predictable price point. Guaranteed wins at a predictable price are antithetical to the concept of a competitive auction. However, many bidders are required by their advertisers to execute campaigns with certain parameters (e.g., number of impressions, a fixed period of time, various targeting constraint, etc.) for a contracted price. Since a fair exchange cannot guarantee impressions at a certain price to the detriment of other bidders and its publishers, this becomes a risk management issue for the bidder. Recent features have evolved to address this partially such as executing a priori deals between publishers and bidders, but this requires substantial human interaction and negotiation, which is also antithetical to the programmatic qualities of RTB.

The aforementioned problems experienced in RTB are addressed in various combinations by the solutions presented as the current invention.

In one embodiment, the solution can be referred to as a "response micro-buy". A "micro-buy" is a buy order placed by the bidder to the exchange (i.e., buyer to seller) for N impressions over a bounded period of time. It is referred to as "micro" since typical parameters might be a relatively small number of impressions over a relatively small timespan (e.g., 1,000 impressions within the next 5 minutes), but not necessarily so. This extends the baseline known prior art RTB since a standard bid response could be characterized as an immediate (i.e., zero timespan) buy order for only the impression in the bid request. A "response micro-buy" indicates that the buy order is placed on a bid response as opposed to a separate interface.

Figure 3:
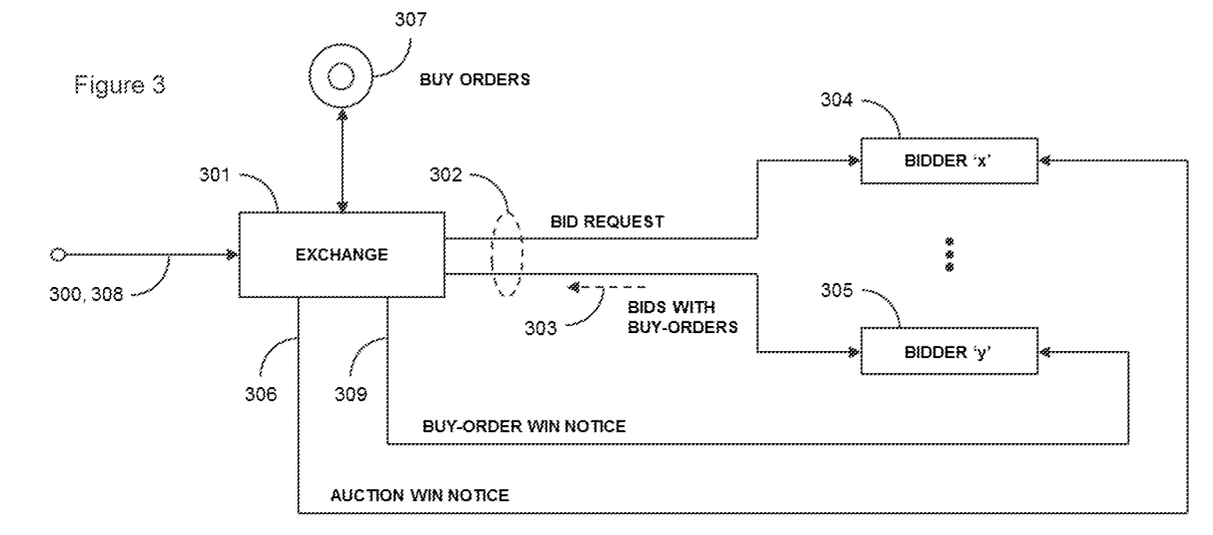
FIG. 3 is a block diagram used to illustrate a variation of the RTB protocol in accordance with the present invention in which a bid for one impression may be accompanied by an open bid or buy order for future similar impressions (i.e., "response buy orders")

FIG. 3 sets forth further details of the "response micro-buy" of the present invention. Similar to the baseline prior art case, an ad request 300 is received by the exchange 301, which broadcasts bid requests 302 to a set of bidders who individually decide whether or not to respond with bids. In this example, bidder 'x' 304 wins the auction and thus receives a win notice 306 from the exchange 301. Bidder 'y' 305 did not win but, its response 303 contained a buy order (i.e., a "response micro-buy"). Via this buy order, bidder 'y' 305 expresses to the exchange 301, "If I lose this auction, automatically consider my bid in future auctions of substantially similar impressions until I win or until T seconds expire." The exchange 301 saves this buy order in a data store 307 with other buy orders.

Continuing the example, eventually a new ad request 308 is received by the exchange 301 for an impression that is substantially similar to the previous request. In addition to broadcasting a new set of bid requests 302, the exchange 301 consults its data store 307 of buy orders. It finds the previously stored buy order from bidder 'y' 305 and determines that this impression is substantially similar to the impression expressed in the buy order. The exchange 301 therefore considers the bid within the buy order, along with any new bids from bidders, when conducting its auction. To generalize, there may be several buy orders for impressions that are substantially similar to the current impression and thus may be considered in this auction. In this example, the buy order bid from bidder 'y' 305 does in fact win. The exchange 301 sends a win notice 309 to bidder 'y' 305 and closes the buy order within its data store 307 as having been fulfilled.

For bidders who want to track specific attributes about the impressions they are buying, the win notice 309 could be enhanced to include the full details of the impression in cases when the impression was procured via a buy order (i.e., when the bidder did not receive the actual bid request in a live auction). Typically, RTB win notices are HTTP GET operations. To satisfy this feature, the win notice could be changed to an HTTP POST operation, where the original bid request details are sent as the POST body. HTTP GET and HTTP POST operations are well known in the art and need not be discussed in further detail herein.

There are several variations possible for the expression of the buy order in the "response micro-buy" solution. One variation is "Whether I win or lose this auction, consider my bid automatically in future auctions of substantially similar impressions until I win or until T seconds expire." Another variation is "Consider my bid automatically in future auctions, of substantially similar impressions, when I do not present a new bid, until I win or until T seconds expire." Another variation is "Consider my bid automatically in future auctions, of substantially similar impressions until I win N such impressions or until T seconds expire." Various combinations of these cases are also possible. The latter case requires a generalization to the manner in which the exchange updates buy orders. Referring again to FIG. 3, if the exchange 301 selects a winner from a buy order in its data store 307, the buy order should not necessarily be closed. Instead, the remaining impression count in the buy order should be decremented and the exchange 301 closes the buy order only if the new count is 0. Separately, the exchange closes any buy orders whose maximum times have expired prior to being otherwise fulfilled.

Setting aside the many conceivable options, the common elements of a buy order are the expiration time, the number of impressions, the bid, and a specification of the impression. The foregoing discusses the expression of the expiration time, impression count, and bid. The exchange requires a specification of the impression to know to which future auctions a given buy order applies since the bidder is basically making a bid on an impression for which it may not actually receive a bid request. When submitting a buy order as a "response micro-buy", the present invention exploits the availability of the current bid request as an example of the desired impression, thereby facilitating its specification. However, the exchange must still interpret "substantially similar" when comparing the original impression to those of future auctions. Due to the complex set of attributes within a bid request for an impression, the "response micro-buy" buy order could contain a means for the bidder to specify which attributes made this an impression of interest and worth the submitted bid. For each such attribute, the "response micro-buy" order could further indicate whether the value of that attribute in future auctions must be an exact match, within a numerical range, or some other specification of similarity. It is also conceivable that an exchange might be intelligent enough through the use of advanced algorithms to discern similarity in a sufficiently meaningful way. The trade-off would be lower precision for easier expression.

The "response micro-buy" solution addresses the following previously cited RTB problems. Using a "response micro-buy", a bidder can participate in auctions for which it does not receive bid requests. It needs to receive at least an adequate sampling to find the kinds of impressions that it requires since the current impression is used as the basis for the "substantially similar" concept of the buy order. However, it does not have to receive, process, bid, and eventually win each impression it buys individually. This allows the bidder to configure its exchange connection to significantly lower the number of bid requests per second without sacrificing its exposure to desirable impression inventory. This results in lower bandwidth charges for both the exchange and bidder and lower processing costs by the bidder due to fewer required servers. It also reduces the bidder's vulnerability to losing auctions due to timeouts since bids considered by the exchange from previously submitted buy orders would not be subject to timeout.

In one embodiment, the solution can be referred to as a "request micro-buy". The "micro-buy" concept is similar to that previously presented in the "response micro-buy" solution. It is a buy order placed by the bidder to the exchange (i.e., buyer to seller) for N impressions over a bounded period of time, where the number of impressions and timespan are typically small (e.g., 1,000 impressions within the next 5 minutes), but not necessarily so. This variant is referred to as "request micro-buy" since it is issued by the bidder in a request to the exchange directly, rather than in response to a bid request from the exchange.

Figure 4:
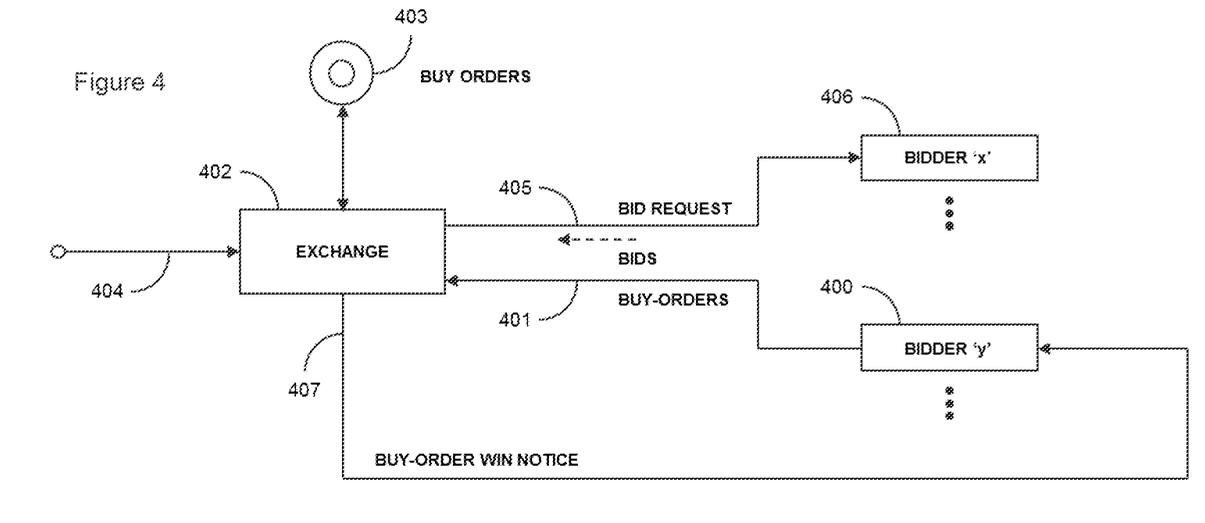
FIG. 4 is a block diagram used to illustrate a variation of the RTB protocol in accordance with the present invention in which a bidder can submit buy orders that will be evaluated in future auctions along with other live bids (i.e., "request buy orders")

Referring to FIG. 4, the solution works as follows. At any time, bidder 'y' 400 can issue a buy order 401 to the exchange 402, which then writes the buy order to its data store 403. In this case, the buy order 401 must define the desired impression(s) explicitly by targeting criteria. This is in contrast to the "response micro-buy" solution wherein the impression in the bid request serves as an example and the micro-buy was defined as impressions substantially similar to that example.

Continuing the example, eventually an ad request 404 is received by the exchange 402. In addition to broadcasting a set of bid requests 405 to bidder 'x' 406 and others, the exchange 402 consults its data store 403 of buy orders and finds the previously stored buy order from bidder 'y' 400. If the exchange 402 determines that this impression matches the targeting criteria expressed in the buy order, it considers the bid within the buy order, along with any new bids from bidders, when conducting its auction. To generalize, there may be several buy orders for impressions that match the current impression and thus may be considered in this auction. In this example, the buy order bid from bidder 'y' 400 does in fact win. The exchange 402 sends a win notice 407 to bidder 'y' 400, updates the buy order within its data store 403 as having filled this impression, and closes the buy order if there are no more impressions defined therein to fill. Separately, the exchange 402 automatically closes any buy orders in its data store 403 that have expired.

For bidders who want to track specific attributes about the impressions they are buying, the win notice 407 could be enhanced to include the full details of the impression in cases when the impression was procured via a buy order (i.e., in cases when the bidder did not receive the actual bid request). Typically, RTB win notices are HTTP GET operations. To satisfy this feature, the win notice could be changed to an HTTP POST operation, where the original bid request details are sent as the POST body.

The "request micro-buy" solution addresses the following previously cited RTB problems. Using a "request micro-buy", a bidder can participate in auctions for which it does not receive bid requests or in the extreme case without ever receiving bid requests. In this case, the bidder executes its campaigns by placing buy orders at an appropriate pace and tracking resulting wins. It can be exposed to all auctions executed by the exchange, while its server load is proportional only to its wins and therefore to the magnitude of its campaigns. By extension its costs are proportional to its revenue. It also eliminates the bidder's vulnerability to losing auctions due to timeouts; bids considered by the exchange from previously submitted buy orders would not be subject to timeout. Finally, bidders operating in this mode would experience drastically lower bandwidth costs. Conversely, exchanges with bidders operating in this mode would also experience significant bandwidth reductions.

It is important to note that traditional RTB as depicted in FIG. 2 can be mixed with either or both of the "response micro-buy" and/or "request micro-buy" solutions depicted in FIGS. 3 and 4, respectively. An exchange can offer any or all of these in combination. A bidder can also support any or all of these in combination when bidding via an exchange with compatible support for these features. For example, a bidder that places "request micro-buys" may also accept standard real-time bid requests on which to bid normally and/or on which to place "response micro-buys".

In one embodiment, the solution can be referred to as a "guaranteed micro-buy". This is a solution to the business need to guarantee a certain win rate at a predictable price point in a true programmatic manner (i.e., without the human interaction between publishers and bidders to setup a priori deals). This is typically problematic since a fair exchange cannot guarantee impressions at a certain price to the detriment of other bidders or its publishers. The solution builds on the foundation of the micro-buy concepts and specifically that the exchange may have a collection of open buy orders already in its data store at the time of an inbound ad request from a publisher.

The "guaranteed micro-buy" embodiment is described as follows. Once an exchange solicits bids, fairness dictates that it accepts the highest bid as the winner. However, if matching buy orders are already on file, the auction can be avoided. For a "guaranteed" buy order, the submitting bidder would need to agree to pay a premium over fair market value for the impression. It would do this by setting a flag on either a "response micro-buy" or a "request micro-buy". This "guarantee premium" is essentially a fee paid by the bidder for the benefit of knowing that it will secure the wins it requires, assuming sufficiency of impression supply, and that it will do so at a price which is a function of fair market value as opposed to simply escalating higher and higher bids. This guarantee premium also serves as consideration to the publisher for effectively agreeing not to require a live auction.

A conflict may arise if the exchange currently has a plurality of guaranteed buy orders on file that both match a given impression. In this case, the exchange would need a price-agnostic selection policy to ensure fairness so as to preserve predictability for the buyers. A first-come-first-serve policy should be the basis of resolution. Since buy orders can specify multiple impressions, the exchange policy will need additional refinement to preserve predictability across buyers such as limiting the impression quantity per buy order or using a round-robin technique among matching buy orders, for example.

Figure 5:
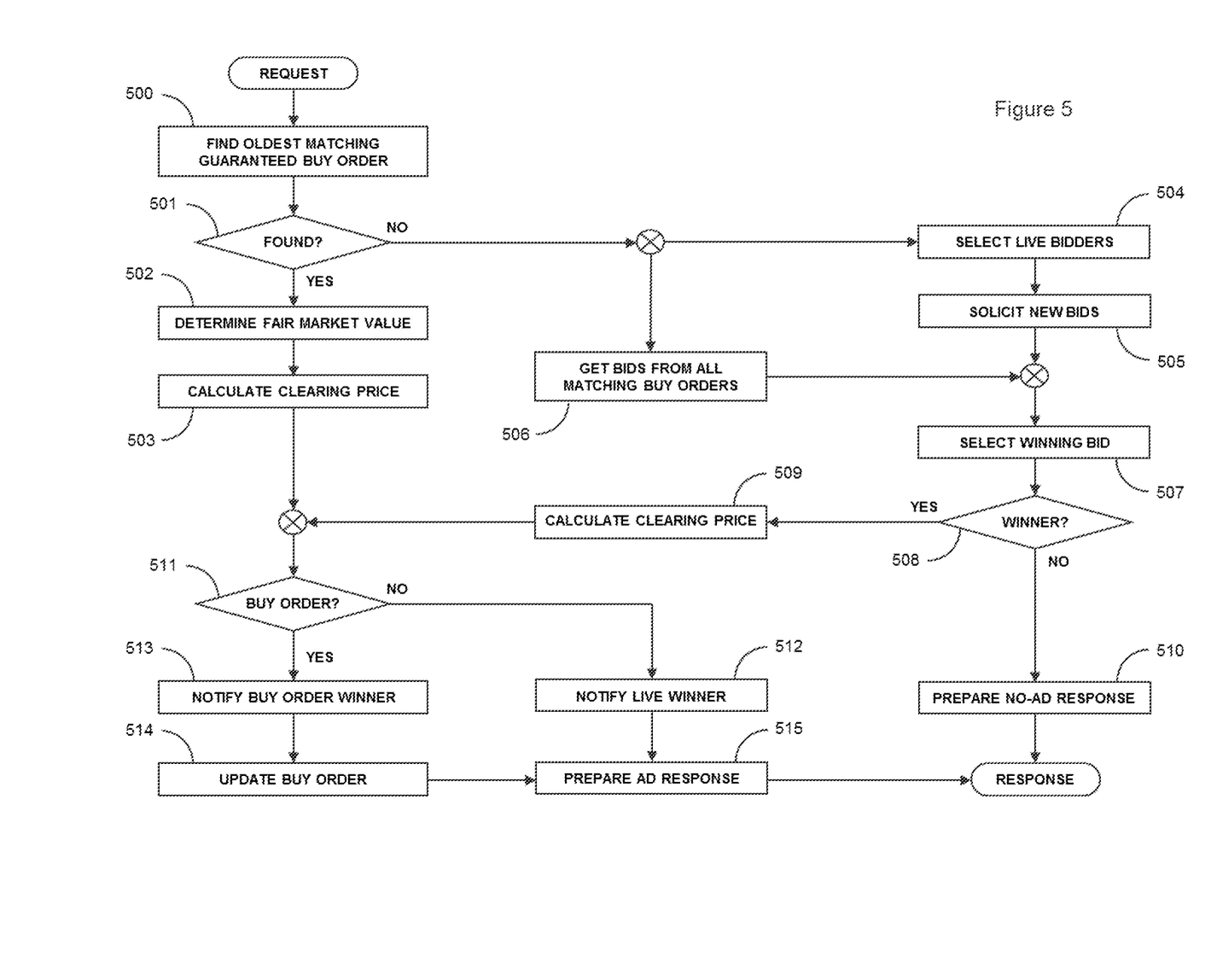
FIG. 5 is a flowchart of a computer routine, in accordance with the present invention, that depicts how an exchange might realize the order fulfillment process integrating the concept of buy orders, guaranteed buy orders, and live auctions.

The full logic flow of the "guaranteed micro-buy" solution within an exchange is illustrated in FIG. 5. The flow begins when the exchange receives an ad request. It first searches 500 its data store for open buy-orders flagged as guaranteed whose targeting parameters match the impression in the ad request and selects the among those found, if any, using a fair policy (e.g., oldest first) as previously discussed.

If a guaranteed buy order was found and selected 501, the exchange considers this the winning bid and hence determines 502 the fair market value of the impression and calculates 503 its clearing price. Fair market value of an impression can be determined 502 in a number of ways. One common method is to select certain attributes from the bid request that are highly predictive of price. Examples include but are not limited to user location, presence of a user or device identifier, device capabilities, type of impression (e.g., banner, interstitial, rich media, video, etc.) and others. For combinations of these "value markers", an exchange would retain historical and recent clearing price data and perhaps adjust by other pertinent data such as conversion rates. This value assessment can be performed either at the time of each ad request or once at the time of buy order submission and saved along with the buy order. The former accounts for real-time value fluctuations while the latter allows a buyer to know the fair market value for the entire buy order prior to execution. In the special case of the "response micro-buy" solution, fair market value could be as simple as the clearing price of the auction on which the buy order was issued since by definition the buy order is for substantially similar impressions.

The clearing price is then calculated 503 as the fair market value of the impression plus the guarantee premium. Methods of calculating this premium may include but are not limited to a) a percentage of the fair market value, b) a fixed value, c) the greater of a percentage of fair market value and a minimum fixed value, and d) a percentage of the fair market value up to a maximum fixed value. Another variation would be for the exchange to allow each of its publishers to set guarantee premium since ultimately this fee is consideration paid in part to the publisher for agreeing to forego a live auction thereby enabling guaranteed processing. Reciprocally, a buy order may include the maximum guarantee fee the buyer is willing to pay above fair market value, which if specified would be another factor in selecting a suitable guaranteed buy order for a given request.

If a guaranteed buy order was not found and selected 501, the exchange must conduct an auction and in furtherance thereof, it collects bids using two methods. The first method is to retrieve 506 from its data store bids from open buy-orders not flagged as guaranteed whose targeting parameters match the impression in the ad request. The second method is the traditional RTB process of selecting 504 a subset of its live bidders that will participate in the auction, based on exchange policies and bidder-imposed filters and rate limits, broadcasting 505 bid requests to this subset of bidders, and awaiting bids in response for up to a maximum auction time.

Once all bids are received, the exchange selects 507 a winner by applying its auction rules including any floor prices. If there is no winner (e.g., no sufficient bids above the floor), the exchange prepares 510 a no-bid response and completes the ad request without returning an ad. If there is a winner, the clearing price is calculated 509 using the auction rules in effect (e.g., first price, second price plus, etc.).

Having selected a winning bid and calculated a clearing price, the exchange notifies the winner. If the winning bid resulted from a live bid (i.e., not an existing buy order) 511, the exchange sends 512 a standard win notice typically as an HTTP GET operation that includes typically the impression identifier and the clearing price, among other information.

If the winning bid was derived from a buy order 511, the exchange sends 513 an enhanced win notice as an HTTP POST operation with similar information plus the full specification of the impression (i.e., the details that would have been in the bid request) in the POST body so that the bidder can track details about the impressions it has procured. The exchange then updates 514 the buy order by decrementing its remaining impressions or closing the buy order if it has been fulfilled (i.e., no more impressions remaining).

Finally, the exchange prepares 515 the ad response given the markup of the ad. Common methods for a bidder to provide the ad markup to the exchange include but are not limited to a) including the markup in the bid in case it wins, b) passing the markup back to the exchange in the win notice response, and c) sending the markup to the exchange a priori and referencing it in either the bid or on the win notice response. The exchange then returns the ad to the publisher.

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

The words "includes" or "including" are specifically intended to be construed as abstractions describing logical sets of open-ended scope and are not meant to convey physical containment unless explicitly followed by the word "within".

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as a nature, type, capacity, or performance of computers or memories; a bandwidth, type, or protocol of any network, network interface, communications link, connection, or coupling; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communications links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design include insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method for a real time bidding exchange selectively soliciting one or more new live bids for one or more ad requests based upon availability of one or more matching buy orders, for the one or more ad requests, in a queue, the method comprising:
- obtaining buy orders from one or more bidders;
- storing the buy orders from the one or more bidders in the queue, wherein the buy orders in the queue comprise one or more buy orders marked as guaranteed and one or more buy orders not marked as guaranteed;
- receiving an ad request, associated with an impression, from a computer system;
- searching the queue, comprising a plurality of buy orders, for one or more buy orders that match the ad request and are marked as guaranteed;
- responsive to identifying at least one buy order that matches the ad request and is marked as guaranteed based upon the searching:
  - (i) refraining from soliciting new live bids, from a plurality of bidders, for the impression, wherein the refraining from soliciting new live bids from the plurality of bidders mitigates bandwidth consumption by the real time bidding exchange; and
  - (ii) selecting, via a processor, a buy order from a set of matching buy orders based upon a determination that:
    - a conflict is associated with two or more buy orders, in the set of matching buy orders, matching the ad request and being marked as guaranteed; and
    - the buy order is an oldest buy order that is marked as guaranteed in the two or more buy orders associated with the conflict, wherein the determination that the buy order is the oldest buy order is made based upon a submission timestamp of the buy order, wherein the selecting is performed without factoring in price, wherein the buy order is associated with a winning bidder for the ad request;
- determining a fair market value of the impression based upon historical metrics of one or more impressions that are similar to the impression;
- calculating a clearing price based upon the fair market value and a fee for applying guaranteed processing to the buy order;
- fulfilling the buy order, in association with the impression, using the clearing price;
- updating the buy order by decrementing a remaining impression count of the buy order and closing the buy order if the remaining impression count is 0;
- sending a win notice to the winning bidder;
- receiving a second ad request, associated with a second impression, from a second computer system;
- responsive to not identifying at least one buy order that matches the second ad request and is marked as guaranteed based upon a search of the queue for one or more buy orders that match the second ad request and are marked as guaranteed:
  - soliciting new live bids for the second impression via an auction;
  - searching a second queue, comprising buy orders, for one or more buy orders that match the second ad request and are not marked as guaranteed; and
  - retrieving one or more bids associated with the one or more buy orders that match the second ad request and are not marked as guaranteed;
  - evaluating a plurality of bids associated with the second ad request to identify a winning bid for the second ad request for which a buy order marked as guaranteed was not identified, wherein the plurality of bids comprise a combination of (i) one or more bids received from one or more bidders in response to the soliciting of the new live bids for the second impression via the auction and (ii) the retrieved one or more bids associated with the one or more buy orders that match the second ad request and are not marked as guaranteed, wherein the evaluating the plurality of bids, comprising the combination of (i) the one or more bids received from one or more bidders in response to the soliciting and (ii) the retrieved one or more bids associated with the one or more buy orders that match the second ad request and are not marked as guaranteed, mitigates bandwidth consumption by the real time bidding exchange; and
  - sending a second win notice to a second winning bidder associated with the winning bid.

2. The method of claim 1, wherein the real time bidding exchange determines a matching buy order by comparing a subset of impression attributes from ad requests for values that match those of an example impression included in the buy order.

3. The method of claim 2, wherein the real time bidding exchange selects a subset of attributes from either a known set of popular attributes or an evolving set of popular attributes based upon history.

4. The method of claim 3, wherein the subset of attributes is matching criteria of numeric data selected from at least one of general numbers, counts, times, dates or currencies.

5. The method of claim 3, wherein the subset of attributes comprise lists of acceptable or alternate values.

6. The method of claim 2, wherein the matching buy order specifies a subset of attributes of specific interest to a buyer.

7. The method of claim 6, wherein the subset of attributes is matching criteria of numeric data selected from at least one of general numbers, counts, times, dates or currencies.

8. The method of claim 6, wherein the subset of attributes is matching criteria including lists of acceptable values or alternate values.

9. The method of claim 2, wherein the buy order indicates acceptable advertising impressions by including required targeting criteria including at least one of numeric values, textual values, ranges or lists, and Boolean logic among specific target criteria.

10. The method of claim 1, wherein the fair market value is a price of a live auction against which the winning bidder issued a response micro-buy that resulted in the buy order from which a current winning bid has been derived.

11. The method of claim 1, wherein the fair market value is determined a priori between the real time bidding exchange and a buyer.

12. The method of claim 1, wherein the real time bidding exchange considers buy orders that have not exceeded their maximum time duration and closes buy orders that have exceeded their maximum time duration.

13. The method of claim 1, wherein the real time bidding exchange does not consider a second buy order unless the second buy order does not specify a maximum guaranteed premium the second buy order is willing to pay.

14. The method of claim 1, wherein the real time bidding exchange does not consider a second buy order unless the second buy order does specify a maximum guaranteed premium the second buy order is willing to pay and the maximum guaranteed premium is greater than a premium would be for a given request based upon at least one of exchange policy or publisher policy.

15. A system associated with a real time bidding exchange selectively soliciting one or more new bids for one or more ad requests based upon availability of one or more matching buy orders, for the one or more ad requests, in a queue, the system comprising:
   a processor; and
   memory comprising instructions that when executed by the processor perform operations comprising:
      obtaining buy orders from one or more bidders;
      storing the buy orders from the one or more bidders in the queue, wherein the buy orders in the queue comprise one or more buy orders marked as guaranteed and one or more buy orders not marked as guaranteed;
      receiving an ad request, associated with an impression, from a computer system;
      searching the queue, comprising a plurality of buy orders, for one or more buy orders that match the ad request and are marked as guaranteed;
      responsive to identifying at least one buy order that matches the ad request and is marked as guaranteed based upon the searching:
         (i) refraining from soliciting new bids, from a plurality of bidders, for the impression, wherein the refraining from soliciting new bids from the plurality of bidders mitigates bandwidth consumption by the real time bidding exchange; and
         (ii) selecting a buy order from a set of matching buy orders based upon a determination that:
            a conflict is associated with two or more buy orders, in the set of matching buy orders, matching the ad request and being marked as guaranteed; and
            the buy order is an oldest buy order that is marked as guaranteed in the two or more buy orders associated with the conflict, wherein the determination that the buy order is the oldest buy order is made based upon a submission timestamp of the buy order, wherein the selecting is performed without factoring in price, wherein the buy order is associated with a winning bidder for the ad request;
      determining a fair market value of the impression based upon historical metrics of one or more impressions that are similar to the impression;
      calculating a clearing price based upon the fair market value and a fee for applying guaranteed processing to the buy order;
      fulfilling the buy order, in association with the impression, using the clearing price;
      updating the buy order by decrementing a remaining impression count of the buy order and closing the buy order if the remaining impression count is 0;
      sending a win notice to the winning bidder;
      receiving a second ad request, associated with a second impression, from a second computer system;
      responsive to not identifying at least one buy order that matches the second ad request and is marked as guaranteed based upon a search of the queue for one or more buy orders that match the second ad request and are marked as guaranteed:
         soliciting new bids for the second impression via an auction;
         searching a second queue, comprising buy orders, for one or more buy orders that match the second ad request and are not marked as guaranteed; and
         retrieving one or more bids associated with the one or more buy orders that match the second ad request and are not marked as guaranteed;
      evaluating a plurality of bids associated with the second ad request to identify a winning bid for the second ad request for which a buy order marked as guaranteed was not identified, wherein the plurality of bids comprise a combination of (i) one or more bids received from one or more bidders in response to the soliciting of the new bids for the second impression via the auction and (ii) the retrieved one or more bids associated with the one or more buy orders that match the second ad request and are not marked as guaranteed, wherein the evaluating the plurality of bids, comprising the combination of (i) the one or more bids received from one or more bidders in response to the soliciting and (ii) the retrieved one or more bids associated with the one or more buy orders that match the second ad request and are not marked as guaranteed, mitigates bandwidth consumption by the real time bidding exchange; and
      sending a second win notice to a second winning bidder associated with the winning bid.

16. The system of claim 15, wherein the real time bidding exchange determines a matching buy order by comparing a subset of impression attributes from ad requests for values that match those of an example impression included in the buy order.

17. The system of claim 16, wherein the real time bidding exchange selects a subset of attributes from either a known set of popular attributes or an evolving set of popular attributes based upon history.

18. A system associated with a real time bidding exchange selectively soliciting one or more new bids for one or more ad requests based upon availability of one or more matching buy orders, for the one or more ad requests, in a queue, the system comprising:
   a processor; and
   memory comprising instructions that when executed by the processor perform operations comprising:
      obtaining buy orders from one or more bidders;
      storing the buy orders from the one or more bidders in the queue, wherein the buy orders in the queue comprise one or more buy orders marked as guaranteed and one or more buy orders not marked as guaranteed;
      receiving an ad request, associated with an impression, from a computer system;
      searching the queue, comprising a plurality of buy orders, for one or more buy orders that match the ad request and are marked as guaranteed;
      responsive to identifying at least one buy order that matches the ad request and is marked as guaranteed based upon the searching:
         (i) refraining from soliciting new bids, from a plurality of bidders, for the impression, wherein the refraining from soliciting new bids from the plurality of bidders mitigates bandwidth consumption by the real time bidding exchange; and
         (ii) selecting a buy order from a set of matching buy orders;
      determining a fair market value of the impression based upon historical metrics of one or more impressions that are similar to the impression;
      calculating a clearing price based upon the fair market value and a fee for applying guaranteed processing to the buy order;

fulfilling the buy order, in association with the impression, using the clearing price;
updating the buy order by decrementing a remaining impression count of the buy order;
receiving a second ad request, associated with a second impression, from a second computer system;
responsive to not identifying at least one buy order that matches the second ad request and is marked as guaranteed based upon a search of the queue for one or more buy orders that match the second ad request and are marked as guaranteed:
  soliciting new bids for the second impression via an auction;
  searching a second queue, comprising buy orders, for one or more buy orders that match the second ad request and are not marked as guaranteed; and
  retrieving one or more bids associated with the one or more buy orders that match the second ad request and are not marked as guaranteed;
evaluating a plurality of bids associated with the second ad request to identify a winning bid for the second ad request for which a buy order marked as guaranteed was not identified, wherein the plurality of bids comprise a combination of (i) one or more bids received from one or more bidders in response to the soliciting of the new bids for the second impression via the auction and (ii) the retrieved one or more bids associated with the one or more buy orders that match the second ad request and are not marked as guaranteed, wherein the evaluating the plurality of bids, comprising the combination of (i) the one or more bids received from one or more bidders in response to the soliciting and (ii) the retrieved one or more bids associated with the one or more buy orders that match the second ad request and are not marked as guaranteed, mitigates bandwidth consumption by the real time bidding exchange; and
sending a second win notice to a second winning bidder associated with the winning bid.

19. The system of claim 18, wherein the real time bidding exchange determines a matching buy order by comparing a subset of impression attributes from ad requests for values that match those of an example impression included in the buy order.

20. The system of claim 19, wherein the real time bidding exchange selects a subset of attributes from either a known set of popular attributes or an evolving set of popular attributes based upon history.

* * * * *